US011244311B2

(12) United States Patent
Luo et al.

(10) Patent No.: US 11,244,311 B2
(45) Date of Patent: Feb. 8, 2022

(54) DECENTRALIZED SMART RESOURCE SHARING BETWEEN DIFFERENT RESOURCE PROVIDERS

(71) Applicant: International Business Machines Corporation, Armonk, NY (US)

(72) Inventors: Lan Luo, Beijing (CN); Jian Zhang, Beijing (CN); Jian Dong Yin, Beijing (CN); Li Xia, Beijing (CN); Li Long Chen, Beijing (CN); Pei Jian Liu, Beijing (CN); Jin Zhang, Beijing (CN); Yan Liu, Beijing (CN); Ye Yu, Beijing (CN); Mei Rui Su, Beijing (CN); Xu Teddy, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 16/142,655

(22) Filed: Sep. 26, 2018

(65) Prior Publication Data

US 2020/0097961 A1    Mar. 26, 2020

(51) Int. Cl.
*G06Q 20/00* (2012.01)
*G06Q 20/38* (2012.01)
*H04L 9/08* (2006.01)
*H04L 9/06* (2006.01)

(52) U.S. Cl.
CPC ....... *G06Q 20/3829* (2013.01); *H04L 9/0637* (2013.01); *H04L 9/0819* (2013.01); *G06Q 2220/00* (2013.01)

(58) Field of Classification Search
CPC ........... G06Q 2220/00; G06Q 2220/10; G06Q 2220/16

USPC ....................................... 705/16, 21; 380/44
See application file for complete search history.

(56) References Cited

U.S. PATENT DOCUMENTS

| 8,584,135 | B2 | 11/2013 | Boss et al. |
| 9,294,236 | B1 | 3/2016 | Ward |
| 2012/0065085 | A1* | 3/2012 | Pestova ................ C12Q 1/6837 506/9 |

(Continued)

FOREIGN PATENT DOCUMENTS

WO    2017021155 A1    2/2017

OTHER PUBLICATIONS

Mell et al., "The NIST Definition of Cloud Computing," National Institute of Standards and Technology Special Publication 800-145, Sep. 2011, 7 pages.

(Continued)

*Primary Examiner* — Dante Ravetti
(74) *Attorney, Agent, or Firm* — Yee & Associates, P.C.

(57) ABSTRACT

Resource sharing is provided. Cryptographic key, resource, and payment information is exchanged between a respective other resource provider having a best matching smart contract response and a particular resource provider selling unused resources. The exchanged cryptographic key, resource, and payment information is verified. The unused resources of the particular resource provider are isolated for dedicated use by the respective other resource provider having the best matching smart contract response. A transaction is performed by sharing the unused resources of the particular resource provider with the respective other resource provider having the best matching smart contract response according to smart contract terms.

18 Claims, 9 Drawing Sheets

(56) References Cited

U.S. PATENT DOCUMENTS

| | | | |
|---|---|---|---|
| 2013/0031028 A1 | 1/2013 | Martin | |
| 2013/0297483 A1 | 11/2013 | Lord | |
| 2017/0063708 A1 | 3/2017 | Hsu et al. | |
| 2017/0366348 A1* | 12/2017 | Weimer | H04L 63/08 |
| 2019/0268284 A1* | 8/2019 | Karame | G06F 21/62 |
| 2019/0334920 A1* | 10/2019 | Kelly | H04L 9/3239 |
| 2021/0065085 A1* | 3/2021 | Walls | G06Q 10/10 |

OTHER PUBLICATIONS

Chichin et al., "Smart Cloud Marketplace-Agent-Based Platform for Trading Cloud Services", Web Intelligence (WI) and Intelligent Agent Technologies (IAT) IEEE/WIC/ACM International Joint Conferences on, Warsaw, Poland, Aug. 11-14, 2014, vol. 3, pp. 388-395.
Xu et al., "Intelligent Resource Management in Blockchain-Based Cloud Datacenters," IEEE Cloud Computing, Nov./Dec. 2017, vol. 4, No. 6, pp. 50-59.

* cited by examiner

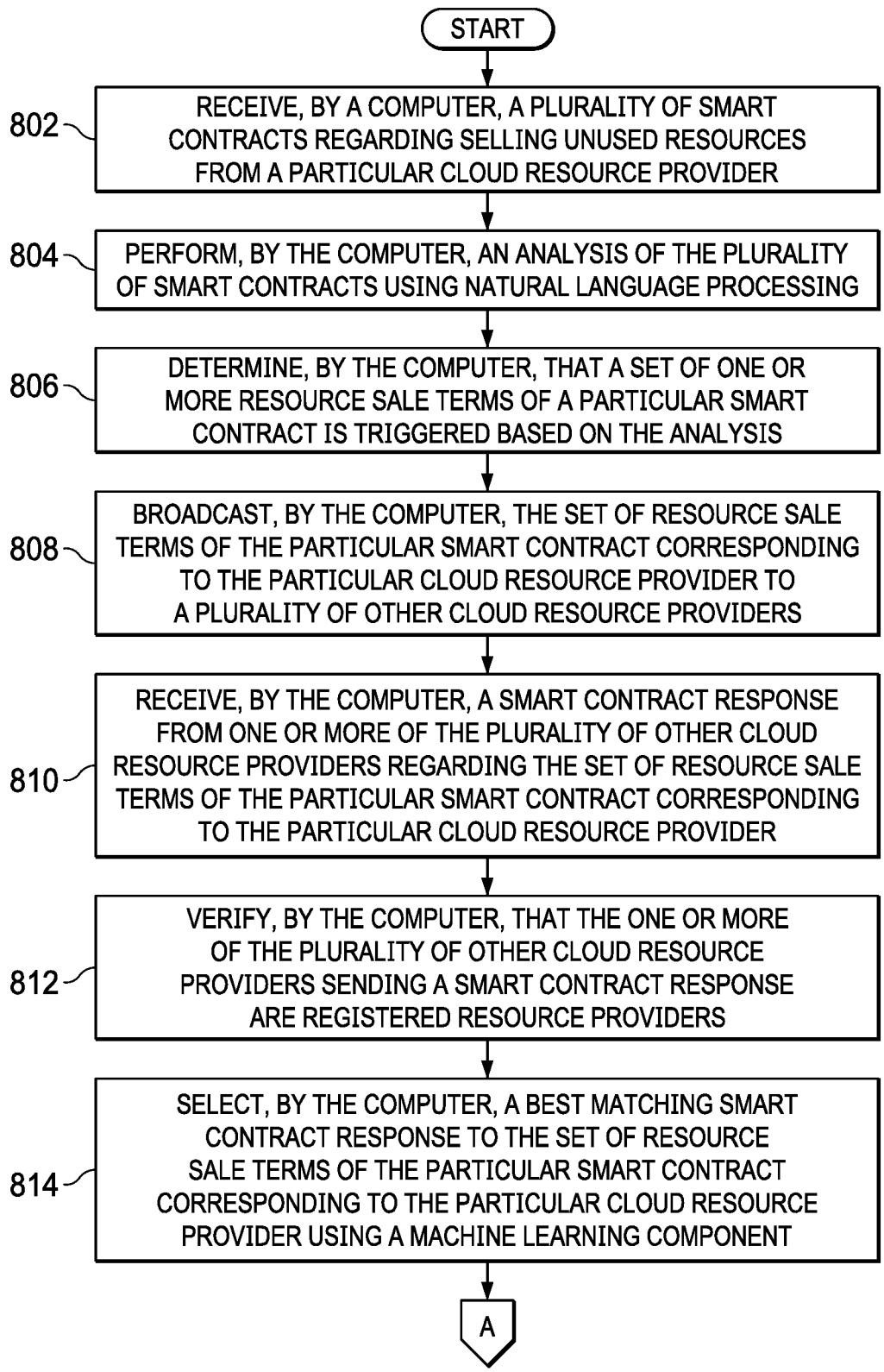

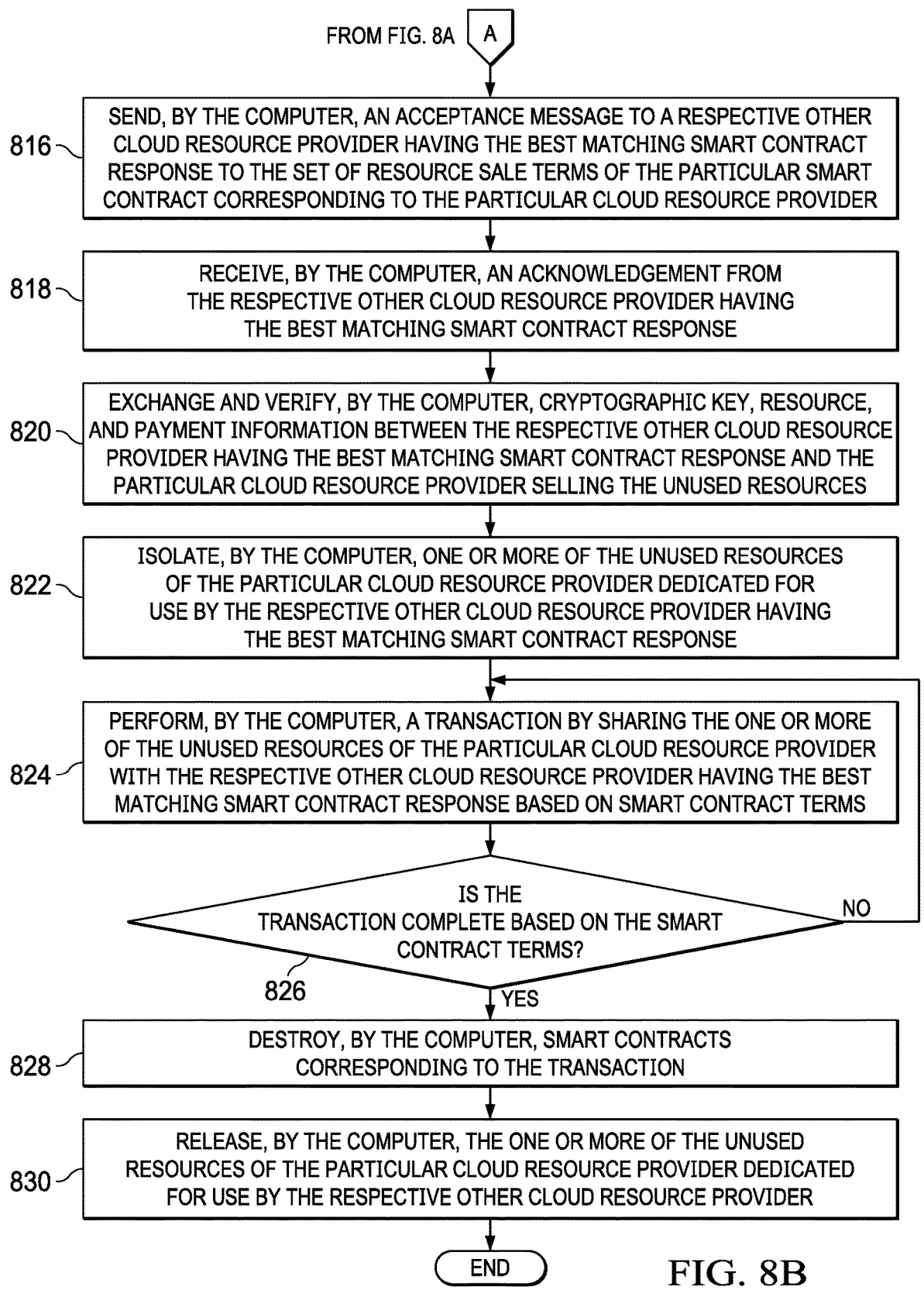

DECENTRALIZED SMART RESOURCE SHARING BETWEEN DIFFERENT RESOURCE PROVIDERS

BACKGROUND

1. Field

The disclosure relates generally to cloud computing and more specifically to providing a decentralized smart sharing of cloud resources between different cloud resource providers.

2. Description of the Related Art

Cloud computing, which is often referred to as "the cloud," is delivery of on-demand computing resources typically over the Internet on a pay-for-use basis. The on-demand computing resources may include everything from applications to data centers. Also, the on-demand computing resources are elastic, which means the resources may be scaled up or scaled down quickly and easily to meet resource consumer demand. In addition, the cloud service is metered so that a resource consumer only pays for what resources a particular consumer uses.

In other words, cloud computing provides pools of configurable computing resources and higher-level services that can be rapidly provisioned with minimal management effort. Third-party cloud resource providers enable entities, such as, for example, companies, enterprises, organizations, and the like, to focus on their core activities instead of expending resources on computer infrastructure and maintenance. Thus, cloud computing allows entities to avoid or minimize up-front Information Technology (IT) infrastructure costs. Cloud computing also allows entities to get their applications up and running faster, with improved manageability and less maintenance.

SUMMARY

According to one illustrative embodiment, a computer-implemented method for resource sharing is provided. A computer exchanges cryptographic key, resource, and payment information between a respective other resource provider having a best matching smart contract response and a particular resource provider selling unused resources. The computer verifies the exchanged cryptographic key, resource, and payment information. The computer isolates the unused resources of the particular resource provider for dedicated use by the respective other resource provider having the best matching smart contract response. The computer performs a transaction by sharing the unused resources of the particular resource provider with the respective other resource provider having the best matching smart contract response according to smart contract terms. According to other illustrative embodiments, a computer system and computer program product for resource sharing are provided.

BRIEF DESCRIPTION OF THE DRAWINGS

FIGS. 8A-8B are a flowchart illustrating a process for resource sharing between different cloud resource providers in accordance with an illustrative embodiment.

DETAILED DESCRIPTION

Figure 1:
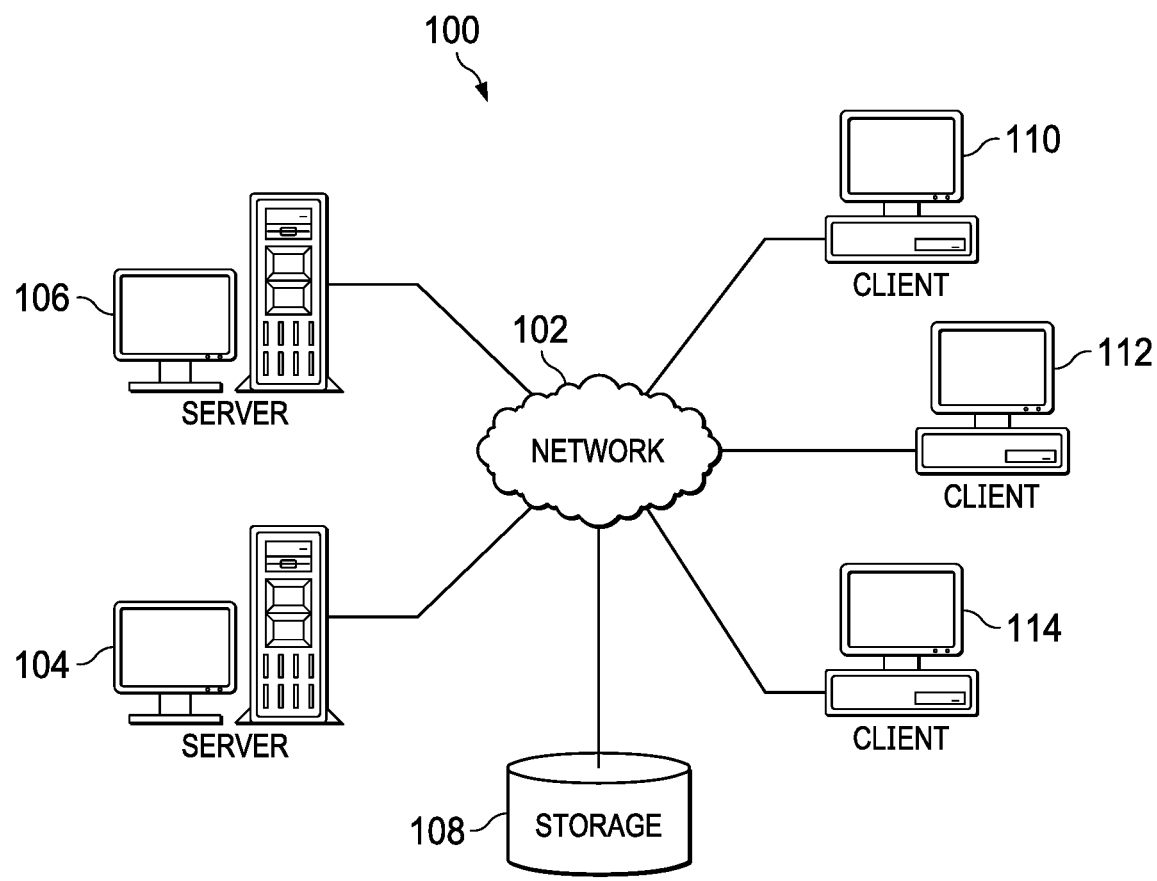
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide one or more services, such as, for example, event monitoring services, financial services, banking services, governmental services, educational services, reservation services, data services, and the like, to client devices. Also, it should be noted that server 104 and server 106 may each represent a cluster of servers in different data centers. Alternatively, server 104 and server 106 may each represent computing nodes in different types of cloud environments managed by different entities.

Further, server 104 may represent a resource selling server and server 106 may represent a resource buying server. In other words, server 104 may contain or control one or more unused or surplus resources, such as, for example, applications, processors, storage, and the like, that are available for sharing with other resource or service providers, such as server 106. Server 104 may, for example, broadcast availability of the unused resources to server 106 using a smart contract. A smart contract is a computer protocol intended to digitally facilitate, verify, and enforce negotiation and performance of an electronic contract. Thus, server 104 offers to sell use of the unused resources based on resource sale terms contained in the smart contract and server 106 may purchase the right to utilize the unused resources corresponding to server 104 in accordance with the resource sale terms of the smart contract. However, it should be noted that server 106 may sell unused resources to server 104 as well.

Client 110, client 112, and client 114 also connect to network 102. Clients 110, 112, and 114 are clients of server 104 and/or server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like. Users of clients 110, 112, and 114 may utilize clients 110, 112, and 114 to access and utilize the services provided by server 104 and/or server 106.

Storage 108 is a network storage device capable of storing any type of data in a structured format or an unstructured format. In addition, storage 108 may represent a plurality of network storage devices. Further, storage 108 may store identifiers and network addresses for a plurality of different resource provider servers, identifiers and network addresses for a plurality of different client devices, identifiers for a plurality of different users, and the like. Furthermore, storage unit 108 may store other types of data, such as authentication or credential data that may include user names, passwords, and biometric data associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

Figure 2:
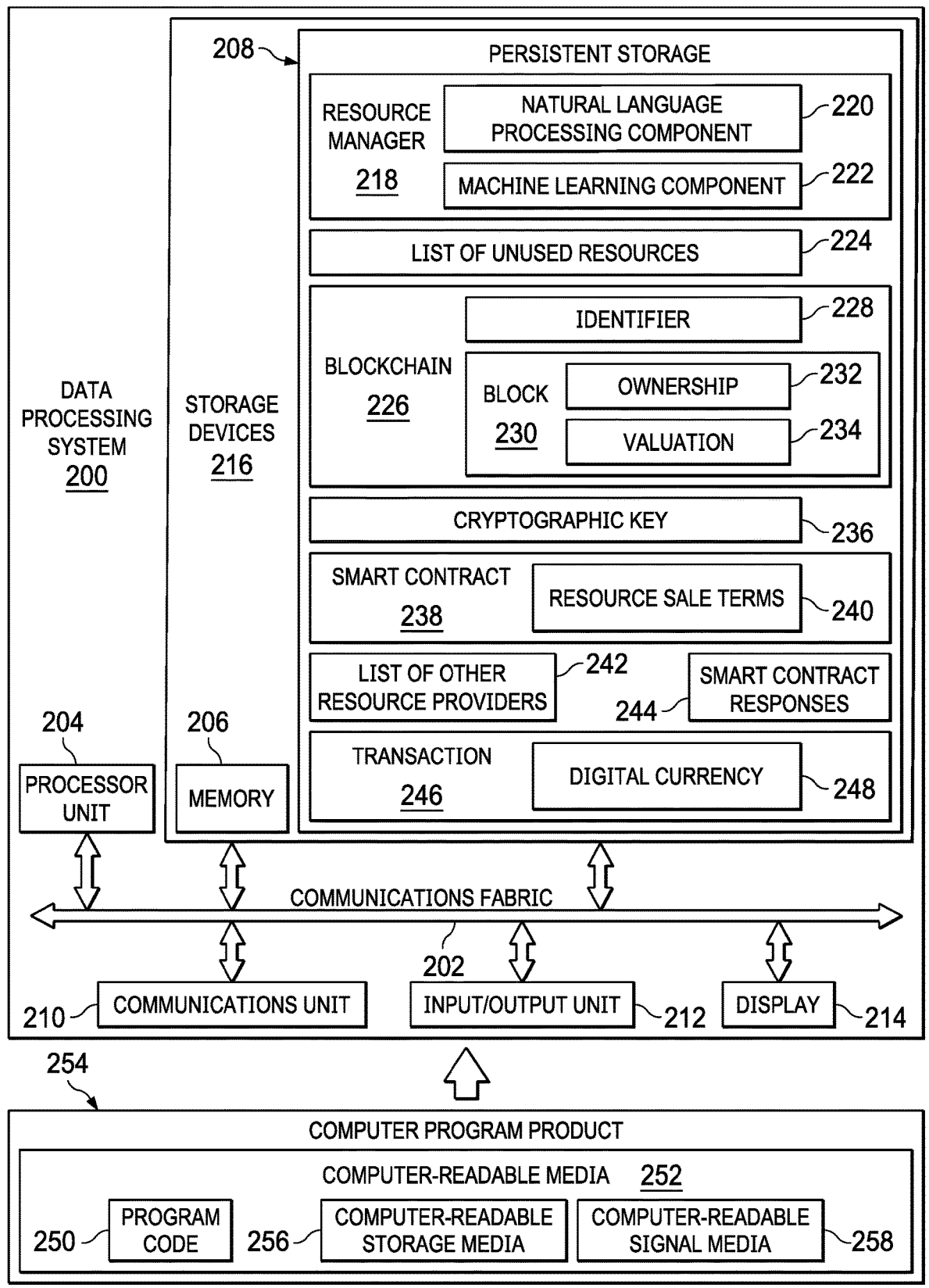
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. Data processing system 200 contains or controls a set of one or more unused resources that are available for use by other resource provider data processing systems. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores resource manager 218. However, it should be noted that even though resource manager 218 is illustrated as residing in persistent storage 208, in an alternative illustrative embodiment resource manager 218 may be a separate component of data processing system 200. For example, resource manager 218 may be a hardware component coupled to communication fabric 202 or a combination of hardware and software components. In another alternative illustrative embodiment, a first portion of resource manager 218 may be located in data processing system 200 and a second portion of resource manager 218 may be located in a second data processing system, such as, for example, server 106 or client 110 in FIG. 1.

Resource manager 218 controls the process of sharing the set of one or more unused resources corresponding to data processing system 200 with other resource providers, such as cloud service providers. In this example, resource manager 218 includes natural language processing component 220 and machine learning component 222. Resource manager 218 utilizes natural language component 220 to parse and understand smart contract terms and utilizes machine learning component 222 to identify and learn resource sharing patterns among different resource providers. Machine learning component 222 may be, for example, an artificial intelligence program.

List of unused resources 224 represents a listing of the set of one or more unused resources contained within and/or controlled by data processing system 200 that are available for sharing with other resource providers. Unused resources may be, for example, processors, memory, storage, applications, virtual machines, a network, and the like. Blockchain 226 represents a secure distributed ledger containing information corresponding to resource sharing transactions between data processing system 200 and other resource providers. Identifier 228 represents a unique identifier, such as, for example, an access address, which corresponds to blockchain 226. Resource manager 218 generates block 230 for each resource sharing transaction and adds block 230 to an end of blockchain 226. Block 230 contains the information corresponding to that particular resource sharing transaction. In this example, block 230 includes ownership 232 and valuation 234. Ownership 232 identifies the owner of the unused resource available for sharing by data processing system 200. Valuation 234 represents the value or selling price corresponding to the unused resource available for sharing in terms of digital currency.

Cryptographic key 236 is a string of bits used by resource manager 218 to transform plain text into cipher text or vice versa. Cryptographic key 236 remains private and ensures secure communication. For example, resource manager 218 may utilize cryptographic key 236 to digitally sign block 230 and smart contract 238.

Smart contract 238 represents a set of one or more smart contracts that corresponds to the unused resources listed in list of unused resources 224. Resource manager 218 may generate smart contract 238 utilizing machine learning component 222 based on learned resource sharing patterns. Smart contract 238 includes resource sale terms 240, which are the terms or conditions for sharing each of the unused resources contained in or controlled by data processing system 200. It should be noted that a computer, other than data processing system 200, may execute the process code of smart contract 238 as long as the computer is a registered member of the smart resource sharing blockchain network.

Resource manager 218 broadcasts or publishes smart contract 238 to other resource providers included in list of other resource providers 242 when one or more of resource sale terms 240 are triggered or satisfied, such as, for example, at a particular time of day and/or day of the week. List of other resource providers 242 represents a list of registered other resource provider data processing systems that may purchase the use of one or more of the unused resources in list of unused resources 224 according to resource sale terms 240 of smart contract 238. Each of the other resource provider data processing systems may be located in, for example, different cloud computing environments.

Smart contract responses 244 represent a set of one or more replies received from one or more other resource provider data processing systems in response to the set of other resource provider data processing systems determining that one or more resource sale terms 240 of smart contract 238 are acceptable. After receiving smart contract responses 244, resource manager 218 uses machine learning component 222 to identify and select a smart contract response that best matches resource sale terms 240 of smart contract 238. Subsequent to selecting the best matching smart contract response to resource sale terms 240 of smart contract 238, resource manager 218 performs transaction 246 according to resource sale terms 240 of smart contract 238. In addition, resource manager 218 transfers digital currency 248, which corresponds to smart contract 238 for the use of the one or more unused resources of data processing system 200, from a digital currency container of the other resource provider data processing system to a digital currency container of data processing system 200.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 250 is located in a functional form on computer readable media 252 that is selectively removable and may be loaded onto or transferred to data processing system 200 for running by processor unit 204. Program code 250 and computer readable media 252 form computer program product 254. In one example, computer readable media 252 may be computer readable storage media 256 or computer readable signal media 258. Computer readable storage media 256 may include, for example, an optical or magnetic disc that is inserted or placed into a drive or other device that is part of persistent storage 208 for transfer onto a storage device, such as a hard drive, that is part of persistent storage 208. Computer readable storage media 256 also may take the form of a persistent storage, such as a hard drive, a thumb drive, or a flash memory that is connected to data processing system 200. In some instances, computer readable storage media 256 may not be removable from data processing system 200.

Alternatively, program code 250 may be transferred to data processing system 200 using computer readable signal media 258. Computer readable signal media 258 may be, for example, a propagated data signal containing program code 250. For example, computer readable signal media 258 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 250 may be downloaded over a network to persistent storage 208 from another device or data processing system through computer readable signal media 258 for use within data processing system 200. For instance, program code stored in a computer readable storage media in a data processing system may be downloaded over a network from the data processing system to data processing system 200. The data processing system providing program code 250 may be a server computer, a client computer, or some other device capable of storing and transmitting program code 250.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 256 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
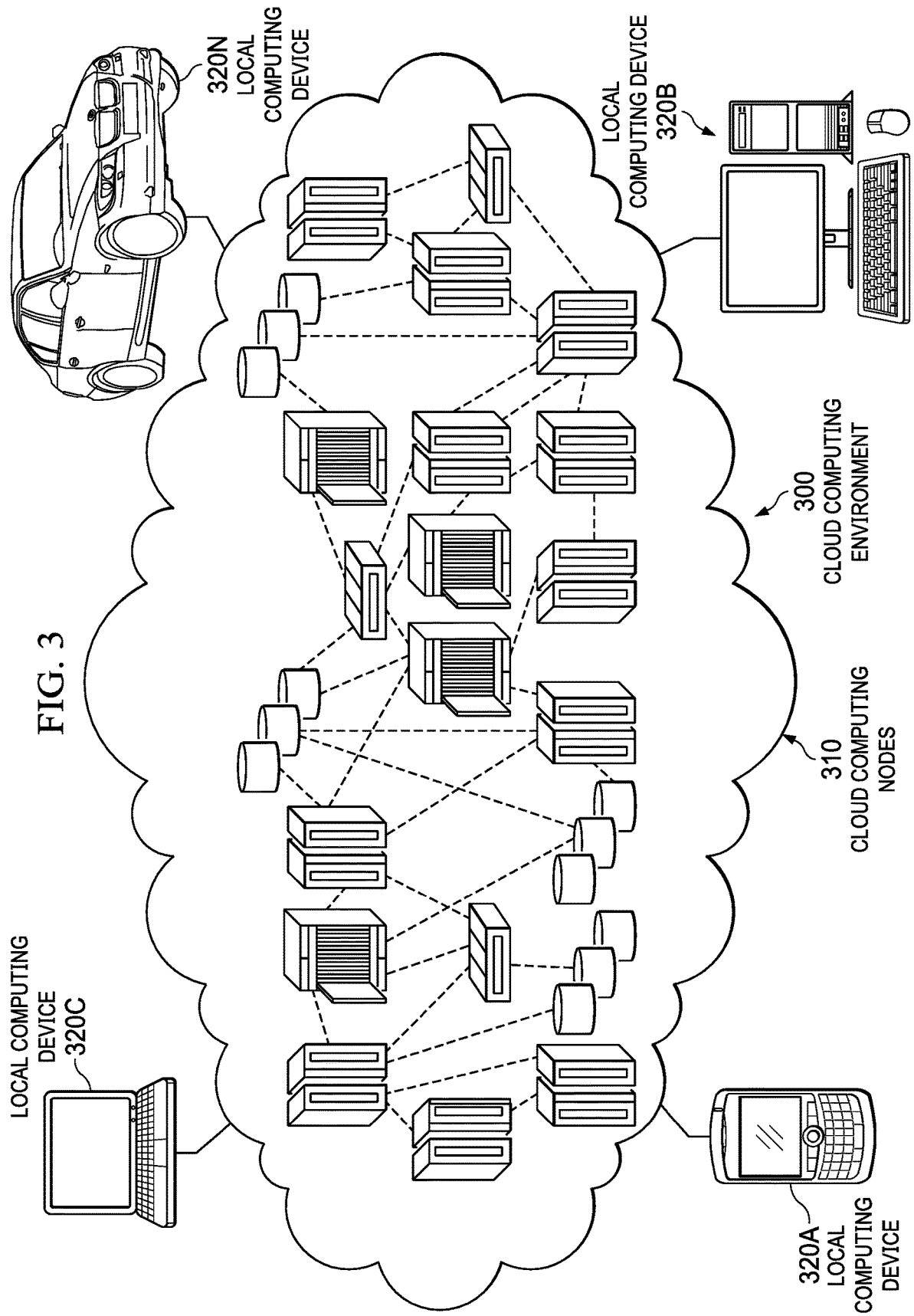
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
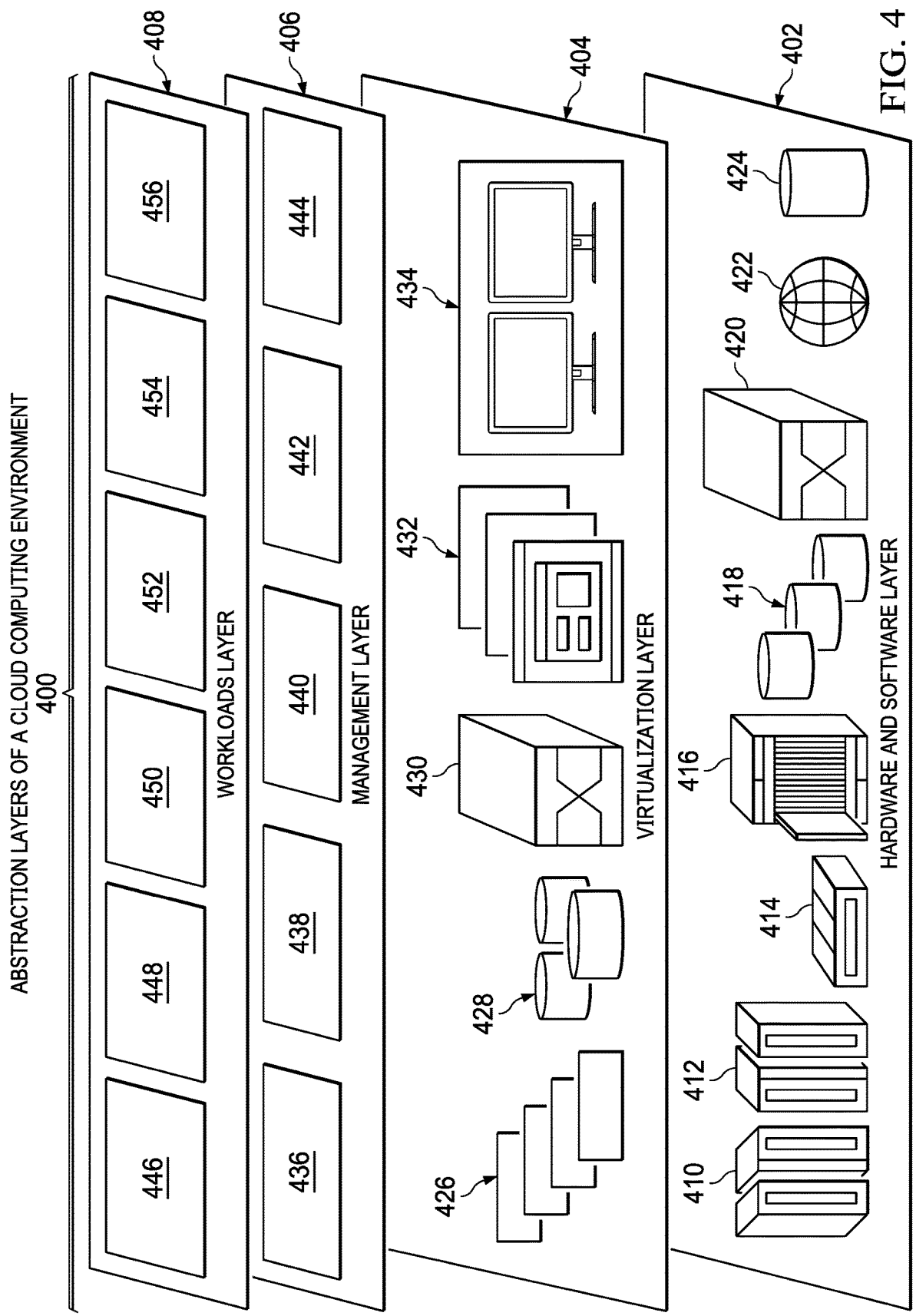
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and cloud resource sharing management 456.

Currently, a variety of different cloud resource providers or vendors exist in the IT market today. However, each of these cloud resource providers typically has a number of redundant computing resources to meet service level agreement demands of their customers. These redundant resources generally go unused by the different cloud resource providers. In addition, no method of sharing these unused resources between the different cloud resource providers currently exists. As a result, a multitude of cloud resources are wasted. Further, no way of metering and billing currently exists for sharing unused resources between cloud resource consumers inside a same cloud environment. Furthermore, an ability to share resources between private cloud resource providers and public cloud resource providers does not currently exist.

Illustrative embodiments provide a technical improvement over the prior art by sharing resources among different public and private cloud resource providers and between different cloud resource consumers in the same public cloud. Illustrative embodiments share, trade, or exchange cloud computing resources among a plurality of different cloud resource providers and cloud resource consumers in a decentralized manner. Illustrative embodiments automatically execute a cloud resource sharing transaction among different cloud resource providers using smart contracts based on learned cloud resource utilization patterns. Illustrative embodiments track cloud resource sharing in a temper-resistant manner using blockchains. Thus, illustrative embodiments provide secure access to shared cloud computing resources. Further, illustrative embodiments link smart contracts to a machine learning component, such as, for example, an artificial intelligence program, to optimize unused resource utilization.

Illustrative embodiments isolate the unused cloud computing resources, which are available for sharing, associated with each cloud resource provider registered with the cloud resource sharing service provided by illustrative embodiments. Illustrative embodiments offer the unused or surplus resources of one cloud resource provider to other cloud resource providers that would like to utilize these unused resources. As the resource owner, the selling cloud resource provider only sells the resource usage right to the buying cloud resource provider. By using a blockchain, illustrative embodiments transact cloud resource sharing based on a uniform model. In addition, all cloud resource sharing transactions are trackable and immutable using blockchain. Furthermore, illustrative embodiments utilize digital currency, such as, for example, cyptocurrency, for these resource sharing transactions allowing valuation of same or similar cloud resources based on a uniform standard. Digital currency is a type of legal tender available only in electronic form and not in physical form, such as bank notes or coins.

Digital currency, exhibits properties similar to physical currencies, but allows for instantaneous transactions and borderless transfer-of-ownership.

A blockchain is an expanding list of data records, called blocks, which are linked using cryptography. Each block contains a cryptographic hash of the previous block, a timestamp, and cloud resource sharing transaction data, such as, for example, seller information, buyer information, digital currency value, and the like. By design, a blockchain is resistant to modification of recorded data. Blockchain is a distributed ledger that can record transactions between two parties in a verifiable and permanent way. For use as a distributed ledger, a blockchain is typically managed by a peer-to-peer network that collectively adheres to a protocol for inter-nodal communication and validation of new blocks. Once recorded, transaction data in any given block cannot be altered retroactively without alteration of all subsequent blocks, which requires consensus of the network majority. As used herein, consensus of the network majority means consensus of a majority of cloud resource providers registered with the cloud resource sharing service provided by illustrative embodiments.

On the blockchain, illustrative embodiments generate a block to log each transaction of resource sharing and perform validation based on a consensus algorithm. Illustrative embodiments also generate a digital currency for cloud resource providers to exchange values without intermediaries, which translates into greater control of cloud resources and lower fees. In addition, illustrative embodiments determine the value of a cloud resource following the same standard.

Illustrative embodiments initialize the blockchain by registering all cloud resources available for sharing among the different cloud resource providers that are registered with the cloud resource sharing service provided by illustrative embodiments. When generating a new block in the blockchain, illustrative embodiments record ownership and digital currency valuation of the shared cloud resource. Illustrative embodiments distribute a digital currency container, such as, for example, a digital wallet, a corresponding private cryptographic key, and access address of the blockchain to each registered cloud resource provider. As a result, each registered cloud resource provider can access all information corresponding to cloud resource sharing recorded in the blockchain. Once a cloud resource is shared between two cloud resource providers, illustrative embodiments generate a new block corresponding to that transaction and add the newly generated block to an end of the blockchain. For every new cloud resource sharing transaction that is successfully recorded in the blockchain, illustrative embodiments transfer an equivalent amount of digital currency from the digital currency container of the buying cloud resource provider to the digital currency container of the selling cloud resource provider that is providing the shared cloud resource. It should be noted that illustrative embodiments only utilize digital currency to perform cloud resource sharing transactions recorded in the blockchain. One possible way to acquire the digital currency is to exchange real currency for the digital currency. The exchange rate may fluctuate based on number of cloud resources available for sharing with other cloud resource providers and amount of digital currency already issued in the blockchain.

Figure 5:
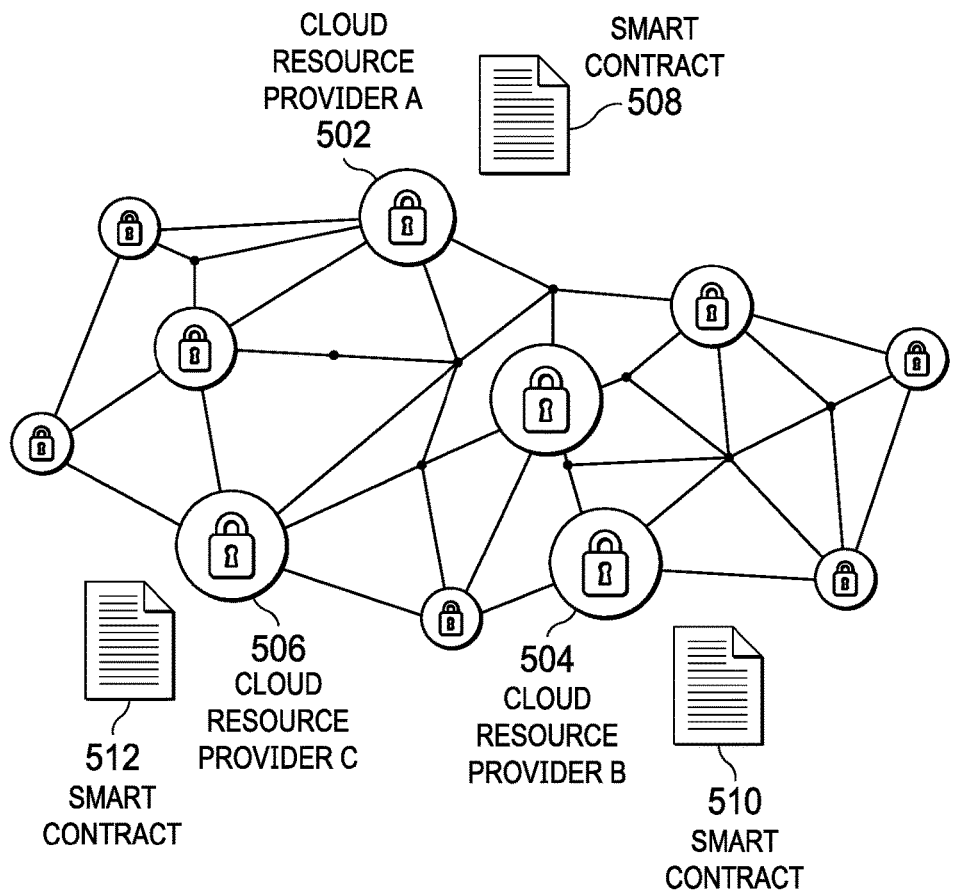
FIG. 5 is a diagram illustrating an example of a decentralized smart resource sharing system in accordance with an illustrative embodiment.

With reference now to FIG. 5, a diagram illustrating an example of a decentralized smart resource sharing system is depicted in accordance with an illustrative embodiment. Decentralized smart resource sharing system 500 may be implemented in a network of data processing systems, such as network data processing system 100 in FIG. 1, or a cloud computing environment, such as cloud computing environment 300 in FIG. 3. Decentralized smart resource sharing system 500 is a system of hardware and software components for automatically sharing unused cloud resources among a plurality of different cloud resource providers, such as private cloud resource providers and public cloud resource providers or different cloud resource providers of a same type. In addition, decentralized smart resource sharing system 500 may automatically share unused resources among a plurality of cloud resource consumers connected to a same cloud.

In this example, decentralized smart resource sharing system 500 includes cloud resource provider A 502, cloud resource provider B 504, and cloud resource provider B 506. However, it should be noted that decentralized smart resource sharing system 500 may include any number and type of cloud resource providers. Cloud resource provider A 502 and cloud resource provider B 504 may be servers, such as, for example, server 104 in FIG. 1, data processing system 200 in FIG. 2, or a cloud computing node in cloud computing nodes 310 in FIG. 3. Cloud resource provider C 506 may be, for example, server 106 in FIG. 1 or another cloud computing node in cloud computing nodes 310 in FIG. 3.

In this example, cloud resource provider A 502 and cloud resource provider B 504 are sellers of unused cloud resources that are available for sharing with other cloud resource providers and cloud resource provider C 506 is a buyer of rights to utilize unused resources provided by other cloud resource providers. In addition, cloud resource provider A 502 corresponds to smart contract 508, cloud resource provider B 504 corresponds to smart contract 510, and cloud resource provider C 506 corresponds to smart contract 512.

Smart contract 508 may include resource sale terms, such as, for example, information identifying cloud resource provider A 502, a digital signature of smart contract 508 provided by a private cryptographic key of cloud resource provider A 502, and information identifying unused resources available for sharing with other cloud resource providers. The resource sale terms may also include one or more triggers for when the resources are available for sharing. For example, a sell trigger may be if workload is less than 20%, then enable smart contract 508 to sell the resources. Further, the resource sale terms may include a function that calls an artificial intelligence API to send out resource sharing transaction proposals.

Smart contract 512 may include resource purchase terms, such as, for example, information identifying cloud resource provider C 506, a digital signature of smart contract 512 provided by a private cryptographic key of cloud resource provider C 506, and information identifying resources for purchase. Further, the resource purchase terms may also include one or more triggers for when the resources are to be purchased. For example, a purchase trigger may be if workload is greater than 80%, then enable smart contract 512 to buy needed resources. Furthermore, the resource purchase terms may include a function that starts accepting any resource sharing proposal that matches criteria of smart contract 512 and calls an artificial intelligence API to select a best matching cloud resource provider selling unused resources.

In this example, one or more terms of smart contract 508 and smart contract 512 are triggered and cloud resource provider C 506 purchases the right to use one or more unused resources of cloud resource provider A 502. Cloud resource provider A 502 records the cloud resource sharing transaction in blockchain 514. The newly generated block in blockchain 514 is validated by consensus mechanism 516 and authentication and authorization are provided by authentication and authorization control 518. It should be noted that communication channel 520 provides communication between the different cloud resource providers. Communication channel 520 may be, for example, peer-to-peer communication. In addition, communication channel 520 may be an encrypted communication channel.

Figure 6:
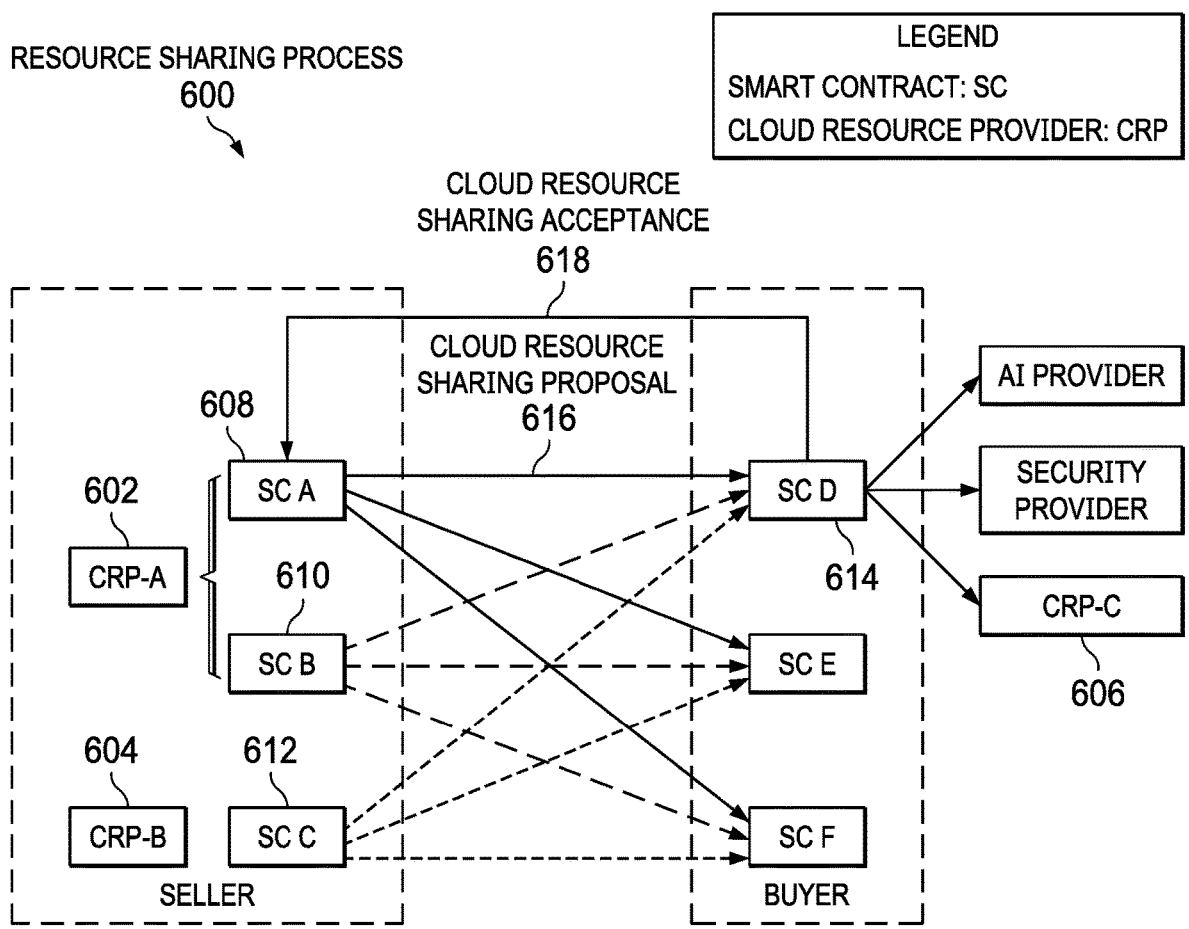
FIG. 6 is a diagram illustrating an example of a resource sharing process in accordance with an illustrative embodiment.
Figure 6:
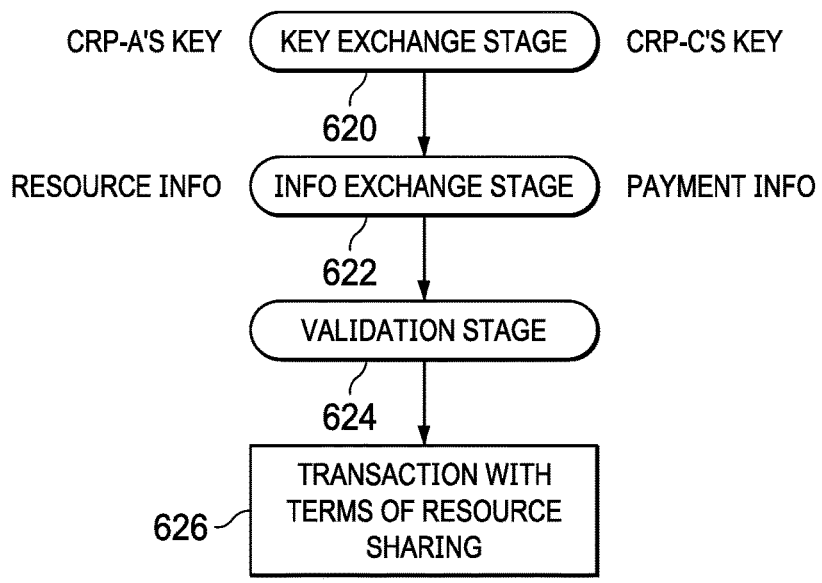

With reference now to FIG. 6, a diagram illustrating an example of a resource sharing process is depicted in accordance with an illustrative embodiment. Resource sharing process 600 includes cloud resource provider A 602, cloud resource provider B 604, and cloud resource provider C 606. Cloud resource provider A 602, cloud resource provider B 604, and cloud resource provider C 606 may be, for example, cloud resource provider A 502, cloud resource provider B 504, and cloud resource provider C 506 in FIG. 5. In addition, cloud resource provider A 602 and cloud resource provider B 604 are resource sellers and cloud resource provider C 606 is a resource buyer.

In this example, cloud resource provider A 602 corresponds to smart contract A 608 and smart contract B 610, cloud resource provider B 604 corresponds to smart contract C 612, and cloud resource provider C 606 corresponds to smart contract D 614. Cloud resource provider A 602 generates smart contract A 608 and smart contract B 610 based on determined resource usage patterns of cloud resource provider A 602 for selling unused cloud resources to other cloud resource providers. Cloud resource provider A 606 may determine resource usage patterns using, for example, a machine learning component, such as an artificial intelligence program. Similarly, cloud resource provider B 608 generates smart contract C 612. In addition, cloud resource provider C 606 generates smart contract D 614 based on determined resource usage patterns of cloud resource provider C 614 for buying unused cloud resources from other cloud resource providers.

Cloud resource provider A 602 determines that smart contract A 608 is triggered by, for example, a defined time window or a resource usage gate being met. As a result, cloud resource provider A 602 broadcasts smart contract A 608 as cloud resource sharing proposal 616 to a plurality of other cloud resource providers. In this example, cloud resource provider C 606 determines that cloud resource sharing proposal 616 matches smart contract D 614. In addition, cloud resource provider C 606 may utilize a security component to verify that cloud resource provider A 602 is a registered or authorized cloud resource seller. Further, if cloud resource provider C 606 receives several cloud resource sharing proposals from several different cloud resource providers, then cloud resource provider C 606 may utilize an artificial intelligence component to select a best matching cloud resource sharing proposal to smart contract D 614.

In this example, cloud resource provider C 606 accepts cloud resource sharing proposal 616 corresponding to smart contract A 608 of cloud resource provider A 602 and sends cloud resource sharing acceptance 618 to cloud resource provider A 602. Then, cloud resource provider A 602 and cloud resource provider C 606 exchange cryptographic key information at 620. Further, cloud resource provider A 602 and cloud resource provider C 606 exchange resource information and payment information at 622. Furthermore, cloud resource provider A 602 and cloud resource provider C 606 validate the exchanged information at 624. After validation of the exchanged information, cloud resource provider A 602 isolates the set of one or more cloud resources corresponding to smart contract A 608 for dedicated use by cloud resource provider C 606 and performs a cloud resource sharing transaction at 626 according to the terms or conditions of smart contract A 608 and smart contract D 614. Moreover, cloud resource provider A 602 records the cloud resource sharing transaction in a blockchain, such as blockchain 514 in FIG. 5.

Upon completion of the cloud resource sharing transaction between cloud resource provider A 602 and cloud resource provider C 606, smart contract A 608 and smart contract D 614 self-destroy. However, it should be noted that if smart contract A 608 provides more cloud resources for sharing than smart contract D 614 needs, then smart contract A 608 may remain active until self-destroy criteria are satisfied, such as, for example, a deadline is reached or the remaining cloud resources are sold to one or more other cloud resource providers. Similarly, if smart contract D 614 requires more cloud resources than smart contract A 608 provides, then smart contract D 614 may remain active until self-destroy criteria are satisfied, such as, for example, a peak workload window is past or no more cloud resources are needed.

Figure 7:
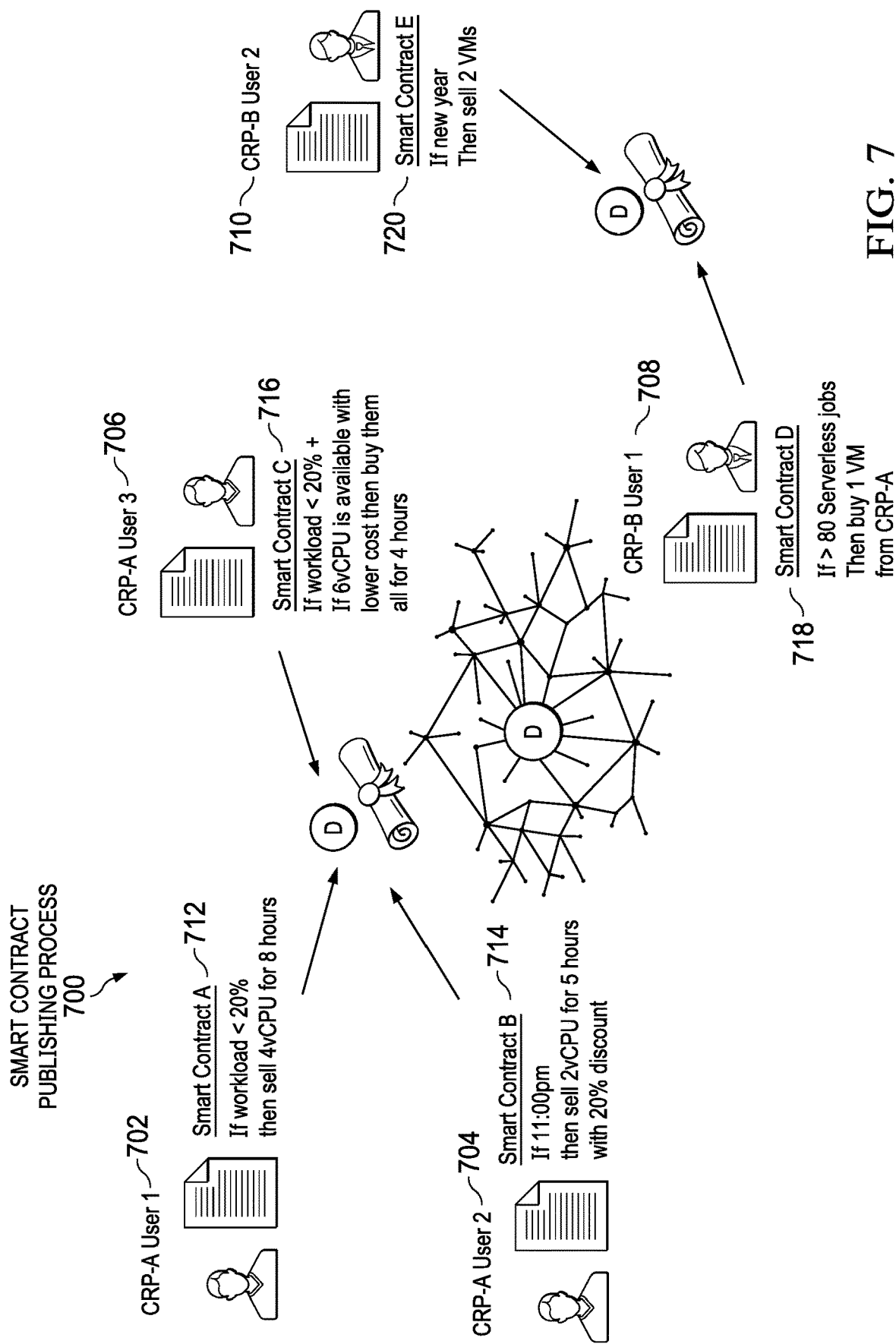
FIG. 7 is a diagram illustrating an example of a smart contract publishing process in accordance with an illustrative embodiment.

With reference now to FIG. 7, a diagram illustrating an example of a smart contract publishing process is depicted in accordance with an illustrative embodiment. Smart contract publishing process 700 includes cloud resource provider A user 1 702, cloud resource provider A user 2 704, cloud resource provider A user 3 706, cloud resource provider B user 1 708, and cloud resource provider B user 2 710. In this example, cloud resource provider A user 1 702 generates smart contract A 712, cloud resource provider A user 2 704 generates smart contract B 714, cloud resource provider A user 3 706 generates smart contract C 716, cloud resource provider B user 1 708 generates smart contract D 718, and cloud resource provider B user 2 710 generates smart contract E 720.

Smart contract A 712 contains a cloud resource term that if workload is less than 20%, then sell 4 central processing units (CPUs) for 8 hours. Smart contract B 714 contains a cloud resource term that if 11:00 p.m., then sell 2 CPUs for 5 hours with a 20% discount. Smart contract C 716 contains a cloud resource term that if workload is less than 20% and if 6 CPUs are available with lower cost, then buy all 6 CPUs for 4 hours. This is an example of cloud resource sharing between cloud resource providers within a same cloud environment.

Smart contract D 718 contains a cloud resource term that if greater than 80% serverless jobs, then buy 1 virtual machine from cloud resource provider A. This is an example of cloud resource sharing between cloud resource providers in different cloud environments. Smart contract E 720 contains a cloud resource term that if new year, then sell 2 virtual machines. It should be noted that the smart contracts utilize digital currency for the transactions.

With reference now to FIGS. 8A-8B, a flowchart illustrating a process for resource sharing between different cloud resource providers is shown in accordance with an illustrative embodiment. The process shown in FIGS. 8A-8B may be implemented in a computer, such as, for example, server 104 in FIG. 1.

The process begins when the computer receives a plurality of smart contracts regarding selling unused resources from a particular cloud resource provider (step 802). The computer performs an analysis of the plurality of smart contracts using natural language processing (step 804). Subsequently, the computer determines that a set of one or more resource sale terms of a particular smart contract is triggered based on the analysis (step 806).

Afterward, the computer broadcasts the set of resource sale terms of the particular smart contract corresponding to the particular cloud resource provider to a plurality of other cloud resource providers (step 808). The computer receives a smart contract response from one or more of the plurality of other cloud resource providers regarding the set of resource sale terms of the particular smart contract corresponding to the particular cloud resource provider (step 810). The computer verifies that the one or more of the plurality of other cloud resource providers sending a smart contract response are registered or authorized resource providers (step 812).

After verifying that the one or more of the plurality of other cloud resource providers sending a smart contract response are registered resource providers, the computer, using a machine learning component, selects a best matching smart contract response to the set of resource sale terms of the particular smart contract corresponding to the particular cloud resource provider (step 814). The computer sends an acceptance message to a respective other cloud resource provider having the best matching smart contract response to the set of resource sale terms of the particular smart contract corresponding to the particular cloud resource provider (step 816). In addition, the computer receives an acknowledgement from the respective other cloud resource provider having the best matching smart contract response (step 818).

Then, the computer exchanges and verifies cryptographic key, resource, and payment information between the respective other cloud resource provider having the best matching smart contract response and the particular cloud resource provider selling the unused resources (step 820). Further, the computer isolates one or more of the unused resources of the particular cloud resource provider dedicated for use by the respective other cloud resource provider having the best matching smart contract response (step 822). Furthermore, the computer performs a transaction by sharing the one or more of the unused resources of the particular cloud resource provider with the respective other cloud resource provider having the best matching smart contract response based on smart contract terms (step 824).

Subsequently, the computer makes a determination as to whether the transaction is complete based on the smart contract terms (step 826). If the computer determines that the transaction is not complete based on the smart contract terms, no output of step 826, then the process returns to step 824 where the computer continues to share the one or more of the unused resources. If the computer determines that the transaction is complete based on the smart contract terms, yes output of step 826, then the computer destroys smart contracts corresponding to the transaction (step 828). In addition, the computer releases the one or more of the unused resources of the particular cloud resource provider dedicated for use by the respective other cloud resource provider (step 830). Thereafter, the process terminates.

Thus, illustrative embodiments of the present invention provide a computer-implemented method, computer system, and computer program product for providing a decentralized smart sharing of cloud resources between different cloud resource providers. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for resource sharing, the computer-implemented method comprising:
   broadcasting, by a processor unit of a particular resource provider selling unused resources, a set of resource sale terms of a particular smart contract that indicates an availability of the unused resources and corresponds to the particular resource provider to another resource provider, wherein the broadcasting is performed when at least one of the set of resource sale terms indicate an availability of the unused resources:
   receiving, by the processor unit of particular resource provider, a smart contract response from the another resource provider regarding the set of resource sale terms of the particular smart contract corresponding to the particular resource provider;
   performing, by the processor unit of the particular resource provider, a resource sharing transaction by sharing the unused resources of the particular resource provider with the another resource provider;
   transferring, by the processor unit of the particular resource provider, digital currency from a first digital currency container corresponding to the another resource provider to a second digital currency container corresponding to the particular resource provider according to the smart contract terms; and
   generating, by the processor unit of the particular resource provider, the particular smart contract utilizing machine learning based on learned resource sharing patterns of the particular resource provider.

2. The computer-implemented method of claim 1 further comprising: recording, by the processor unit of the particular resource provider, the resource
   sharing transaction in a blockchain digital ledger containing information corresponding to resource sharing transactions between the particular resource provider and the another resource provider.

3. The computer-implemented method of claim 2, wherein recording the resource sharing transaction comprises recording ownership and digital currency valuation of the unused resources in the blockchain digital ledger.

4. The computer-implemented method of claim 1 further comprising:
   broadcasting, by the processor unit of the particular resource provider, the set of resource sale terms of the particular smart contract corresponding to the particular resource provider to a plurality of other resource providers
   when broadcasting the set of resource sale terms of the particular smart contract to the another resource provider; and
   receiving, by the processor unit of the particular resource provider, a smart contract response from one or more of the plurality of other resource providers regarding the se t of resource sale terms of the particular smart contract corresponding to the particular resource provider.

5. The computer-implemented method of claim 4 further comprising:
   verifying, by the processor unit of the particular resource provider, that the one or more of the plurality of other resource providers sending a smart contract response are registered resource providers.

6. The computer-implemented method of claim 5 further comprising:

responsive to the processor unit of the particular resource provider verifying that the one or more of the plurality of other resource providers sending a smart contract response are registered resource providers, selecting, by the processor unit of the particular resource provider utilizing machine learning, a matching smart contract response to the set of resource sale terms of the particular smart contract corresponding to the particular resource provider.

7. The computer-implemented method of claim 6 further comprising:

sending, by the processor unit of the particular resource provider, an acceptance message to a respective other resource provider having the matching smart contract response to the set of resource sale terms of the particular smart contract corresponding to the particular resource provider; and receiving, by the processor unit of the particular resource provider, an acknowledgement from the respective other resource provider having the matching smart contract response.

8. The computer-implemented method of claim 1, wherein the broadcasting is performed in response to at least one of the resource sale terms being satisfied.

9. A computer system, of a particular resource provider selling unused resources, for resource sharing, the computer system comprising:

a bus system;

a non-transitory, tangible computer readable storage device connected to the bus system, wherein the storage device stores program instructions; and a processor connected to the bus system, wherein the program instructions, when executed by the processor, cause the processor to perform steps of:

broadcasting a set of resource sale terms of a particular smart contract that indicates an availability of the unused resources and corresponds to the particular resource provider to another resource provider; receiving a smart contract response from the another resource provider regarding the set of resource sale terms of the particular smart contract corresponding to the particular resource provider; performing a resource sharing transaction by sharing the unused resources of the particular resource provider with the another resource provider;

and transferring digital currency from a first digital currency container corresponding to the another resource provider to a second digital currency container corresponding to the particular resource provider according to the smart contract terms; and generating the particular smart contract utilizing machine learning based on learned resource sharing patterns of the particular resource provider.

10. The computer system of claim 9, wherein the program instructions, when executed by the processor, cause the processor to perform an addition step of:

record the resource sharing transaction in a blockchain digital ledger containing information corresponding to resource sharing transactions between the particular resource provider and the another resource provider.

11. A computer program product for resource sharing, the computer program product comprising a non-transitory, tangible computer readable storage medium having program instructions embodied therewith, the program instructions executable by a processor unit of a particular resource provider selling unused resources to cause the processor unit of the particular resource provider to perform a method comprising:

broadcasting, by the processor unit of the particular resource provider, a set of resource sale terms of a particular smart contract that indicates an availability of the unused resources and corresponds to the particular resource provider to another resource provider;

receiving, by the processor unit of the particular resource provider, a smart contract response from the another resource provider regarding the set of resource sale terms of the particular smart contract corresponding to the particular resource provider;

performing, by the processor unit of the particular resource provider, a resource sharing transaction by sharing the unused resources of the particular resource provider with the another resource provider;

transferring, by the unit of the particular resource provider, digital currency from a first digital currency container corresponding to the another resource provider to a second digital currency container corresponding to the particular resource provider according to the smart contract terms; and generating, by the processor unit of the particular resource provider, the particular smart contract utilizing machine learning based on learned resource sharing patterns of the particular resource provider.

12. The computer program product of claim 11 further comprising:

recording, by the processor unit of the particular resource provider, the resource sharing transaction in a blockchain digital ledger containing information corresponding to resource sharing transactions between the particular resource provider and the another resource provider.

13. The computer program product of claim 12, wherein recording the resource sharing transaction comprises recording ownership and digital currency valuation of the unused resources in the blockchain digital ledger.

14. The computer program product of claim 11 further comprising:

broadcasting, by the processor unit of the particular resource provider, the set of resource sale terms of the particular smart contract corresponding to the particular resource provider to a plurality of other resource providers when broadcasting the set of resource sale terms of the particular smart contract to the another resource provider; and receiving, by the processor unit of the particular resource provider, a smart contract response from one or more of the plurality of other resource providers regarding the set of resource sale terms of the particular smart contract corresponding to the particular resource provider.

15. The computer program product of claim 14 further comprising:

verifying, by the processor unit of the particular resource provider, that the one or more of the plurality of other resource providers sending a smart contract response are registered resource providers.

16. The computer program product of claim 15 further comprising:

responsive to the processor unit of the particular resource provide verifying that the one or more of the plurality of other resource providers sending a smart contract response are registered resource providers, selecting, by the processor unit of the particular resource provider utilizing machine learning, a matching smart contract response to the set of resource sale terms of the particular smart contract corresponding to the particular resource provider.

17. The computer program product of claim 16 further comprising:

sending, by the processor unit of the particular resource provider, an acceptance message to a respective other resource provider having the matching smart contract response to the set of resource sale terms of the particular smart contract corresponding to the particular resource provider; and receiving, by the processor unit of the particular resource provider, an acknowledgement from the respective other resource provider having the matching smart contract response.

18. The computer system of claim 9, wherein the particular resource provider is a first cloud resource provider and the respective other resource provider is a second cloud resource provider.

* * * * *